United States Patent [19]

Sato

[11] Patent Number: 4,560,434

[45] Date of Patent: Dec. 24, 1985

[54] METHOD AND APPARATUS FOR PRODUCING BOUFFANT CAPS

[75] Inventor: Takeshi Sato, Azuchi, Japan

[73] Assignees: Nankaisangyo Co. Ltd.; Toyamasanki Co. Ltd., both of Japan

[21] Appl. No.: 565,577

[22] Filed: Dec. 27, 1983

[51] Int. Cl.[4] ..................... B31F 1/34; B32B 31/00; D05B 35/08; A42B 1/12

[52] U.S. Cl. .................................... 156/474; 156/461; 156/494; 156/495; 156/163; 156/176; 156/204; 156/229; 2/68; 2/197; 223/28

[58] Field of Search .............. 156/73.1, 73.4, 163-164, 156/176, 201-202, 204, 227, 229, 461-462, 474, 494-495; 2/68, 195, 197; D2/236; 223/28, 34

[56] References Cited

U.S. PATENT DOCUMENTS

| | | | |
|---|---|---|---|
| 2,084,362 | 6/1937 | Visscher et al. | 156/474 |
| 2,658,551 | 11/1953 | Bender | 156/474 |
| 3,392,890 | 7/1968 | Cramer | 156/474 |
| 4,239,578 | 12/1980 | Gore | 156/495 |
| 4,300,967 | 11/1981 | Sigl | 156/495 |

*Primary Examiner*—Edward C. Kimlin
*Assistant Examiner*—Merrell C. Cashion
*Attorney, Agent, or Firm*—Larson & Taylor

[57] ABSTRACT

A method and apparatus for continuously and efficiently producing bouffant caps, the arrangement comprising a section for supporting and supplying a thin band-like material wound in roll form, a laying section for laying stretchable linear elements in stretched condition on opposite sides of the band-like material being continuously payed out from the supply section, a welding section for integrally attaching the laid stretchable linear elements to the band-like material, a zigzag folding section for widthwise zigzag folding the band-like material having said stretchable linear elements welded thereto, a fixed length seal section for welding at regular intervals the stretchable linear elements laid on the opposite sides of the zigzag folded material, and a cutter section for cutting the material at the middle of each weld region.

13 Claims, 19 Drawing Figures

METHOD AND APPARATUS FOR PRODUCING BOUFFANT CAPS

BACKGROUND OF THE INVENTION

The present invention relates to a method and apparatus for producing inexpensive disposable bouffant caps for use by hospital nurses and cooks and by women in general as shower caps.

Heretofore, such bouffant caps have been produced by circularly punching out a material such as non-woven fabric, sewing the peripheral edge of the resulting cutout together with a rubber string in stretched condition, and turning back the circumferential portion. However, the circular punching-out of a material such as non-woven fabric results in a poor yield of product, which is uneconomical. Further, since they are manually produced by workers, the production efficiency is very low and conventional bouffant caps are not suitable for mass production.

We have previously developed a method of forming such a cap from a square material without circularly punching out the material. This method comprises the steps of folding a square material in zigzags with a suitable width into a bunch form, welding rubber strings in stretched condition to the opposite outermost folds of the bunch with said rubber strings extending lengthwise of the folds, and uniting the opposite ends of the rubber strings on both sides, said bunch, when unfolded, forming a cap. However, this method, like the preceding one, is not suitable for mass production since caps have to be produced one by one from separate sheets of material.

SUMMARY OF THE INVENTION

The present invention relates to a method and apparatus for producing bouffant caps of the desired type.

A principal object of the invention is to provide a method and apparatus for efficiently producing a number of bouffant caps from a long band-like material continuously and automatically without wasting any of the material used, wherein all length and all width of band-like material can be effectively used to economically produce bouffant caps with a good yield.

Another object of the invention is to provide a method and apparatus wherein various sizes of bouffant caps different in diameter can be easily produced and wherein the opposite ends of the zigzag folded product are welded and rugged so that the bouffant cap has no possibility of losing its configuration or utility during use.

The present invention relates to a method of producing bouffant caps, comprising the steps of withdrawing a band-like material such as a non-woven fabric or film lengthwise thereof while laying stretchable linear elements in stretched condition on and along opposite lateral edges of said band-like material on its way and securing said elements to said band-like material, introducing said band-like material into a zigzag folding section which zigzag folds it with a suitable width in the direction of the width to provide a bunch-like folded material having said stretchable linear elements on its opposite sides, welding said material between said stretchable linear elements on both sides at fixed intervals of length, and successively cutting the material at the middle of each welded region. The invention also relates to an apparatus for embodying said method, comprising a band-like material support and supply section for deliverably supporting a band-like material such as a non-woven fabric or film wound in roll form, a stretchable linear element laying section for continuously laying stretchable linear elements on and along opposite lateral edges of said band-like material being delivered while withdrawing said stretchable linear elements from bobbins, a welding section for integrally welding the stretchable linear elements laid on opposite lateral edges of the band-like material to the latter, a zigzag folding section through which the band-like material with said stretchable linear elements welded thereto is passed whereby it is zigzag folded in the direction of the width, a fixed length seal section for welding the zigzag bunched folded material between the stretchable linear elements on both sides at fixed intervals of length, and a cutter section for successively cutting said material at the middle of each welded region.

According to the aforesaid bouffant cap producing method and apparatus of the present invention, a number of bouffant caps can be efficiently produced continuously and automatically from a long band-like material. Further, all length and all width of band-like material can be effectively used without any possibility of some portions of the material being left unused as in the case of using the conventional punching means, to thereby produce caps economically with a good yield.

Further, according to the invention, the width of the band-like material to be used and the distance between adjacent welded regions can be freely set, so that various sizes of bouffant caps different in diameter can be easily produced. Since the opposite ends of the folded product are welded, they are rugged and hence the bouffant cap has no possibility of losing its configuration or utility during use.

BRIEF DESCRIPTION OF THE DRAWINGS

The drawings show a preferred embodiment of the invention.

DETAILED DESCRIPTION OF THE EMBODIMENT

Figure 1:
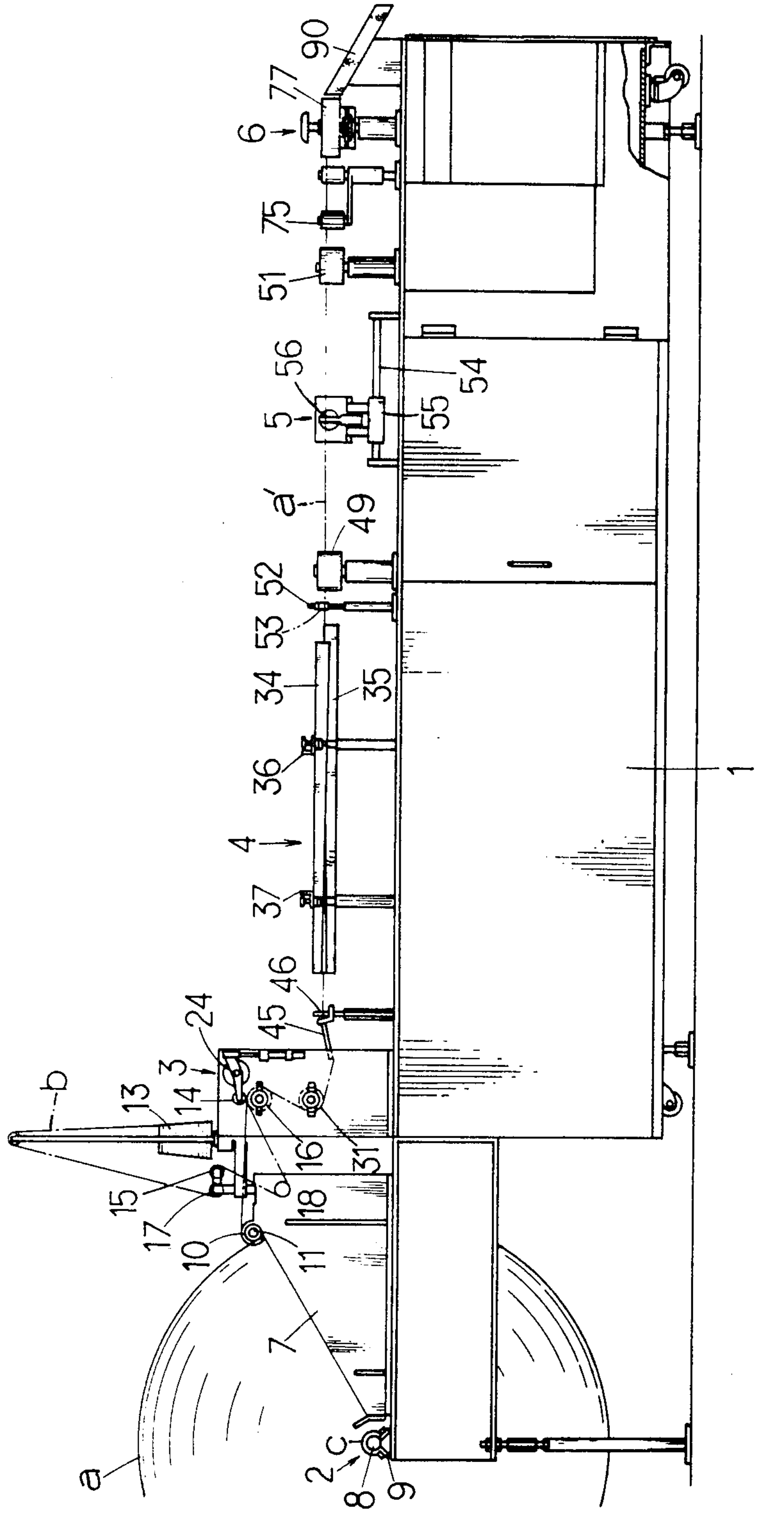
FIG. 1 is a schematic side view of the present inventive apparatus.

A bouffant cap producing apparatus according to the present invention comprises a band-like material support and supply section 2 for supporting and supplying a band-like material a in the form of a thin web such as paper, non-woven fabric or plastic film fed from one end of a machine frame 1 to the other end thereof, a laying section 3 for laying stretchable linear elements b such as rubber strings, a zigzag folding section 4, a fixed length seal mechanism section 5, and a cutter section 6 arranged in the order mentioned.

Figure 2:
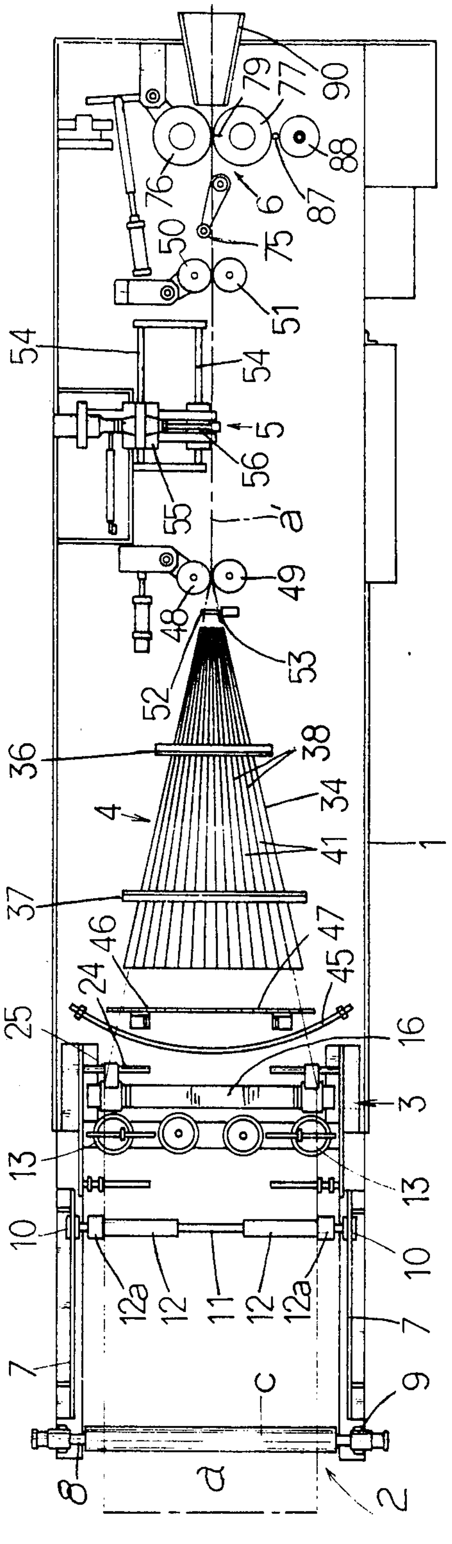
FIG. 2 is a plan view of the same.

The band-like material support and supply section 2, as shown in FIGS. 1 and 2, comprises inclined plates 7 fixedly erected on opposite sides of the upper surface of the machine frame 1 at one end thereof, with their upper end downwardly inclined from the other end (front end) toward one end (rear end), bearings 9 fixed on the machine 1 adjacent the lower ends of said inclined plates 7 for removably supporting the opposite ends of a center shaft 8, a guide shaft 11 provided at its opposite ends with grooved rollers 10 adapted to fit on the slope surfaces of said inclined plates 7 to roll down along said slope surfaces, and guide rollers 12 having collar portions 12*a* of larger diameter and slidably fitted on the opposite ends of said guide shaft 11, said center shaft 8 being inserted in a paper bobbin c on which the band-like material a is wound in roll form, the opposite ends of said shaft 8 being journaled in said bearing 9.

The laying section 3 for laying stretchable linear elements b such as rubber strings comprises bobbins 13 having stretchable linear elements b wound thereon and disposed on both sides of the machine frame forwardly of and adjacent said inclined plates 7, welding rolls 14 and tension adjusting wheels 15 which are disposed forwardly and rearwardly of said bobbins 13, a grooved roller 16 disposed below and in contact with said welding rolls 14, guide wheels 17 disposed rearwardly of the tension adjusting wheels 15, and guide wheels 18 disposed below said guide wheels 17 for feeding the stretchable linear elements b to said welding rolls 14.

Figure 5:
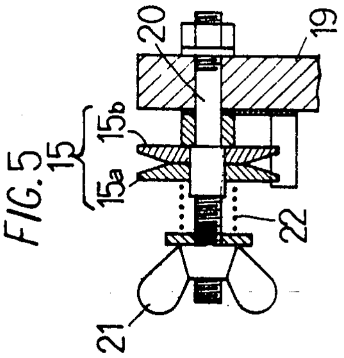
FIG. 5 is a front view, in vertical section, of a tension adjusting wheel.
Figure 3:
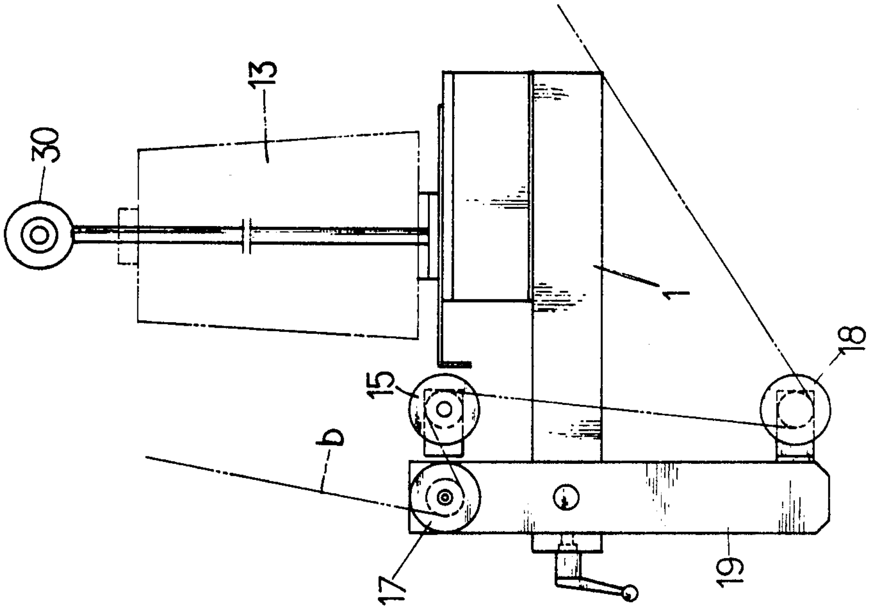
FIG. 3 is a side view showing how a stretchable linear element is supplied.
Figure 4:
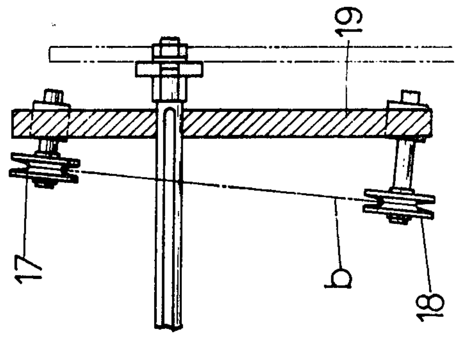
FIG. 4 is a fragmentary front view, partly in vertical section, showing the stretchable linear element being supplied.

Each tension adjusting wheel 15, as shown in FIG. 5, comprises a combination of divisional wheels 15*a* and 15*b* rotatably mounted on a shaft 20 supported at one end thereof by a frame 19 on the machine frame 1, the arrangement being such that the tension on the stretchable linear element b nipped between the divisional wheels 15*a* and 15*b* is adjusted through a spring 22 by turning a nut 21 threadedly engaged with the other end of the shaft, with said spring 22 urging against one divisional wheel 15*a*.

Figure 6:
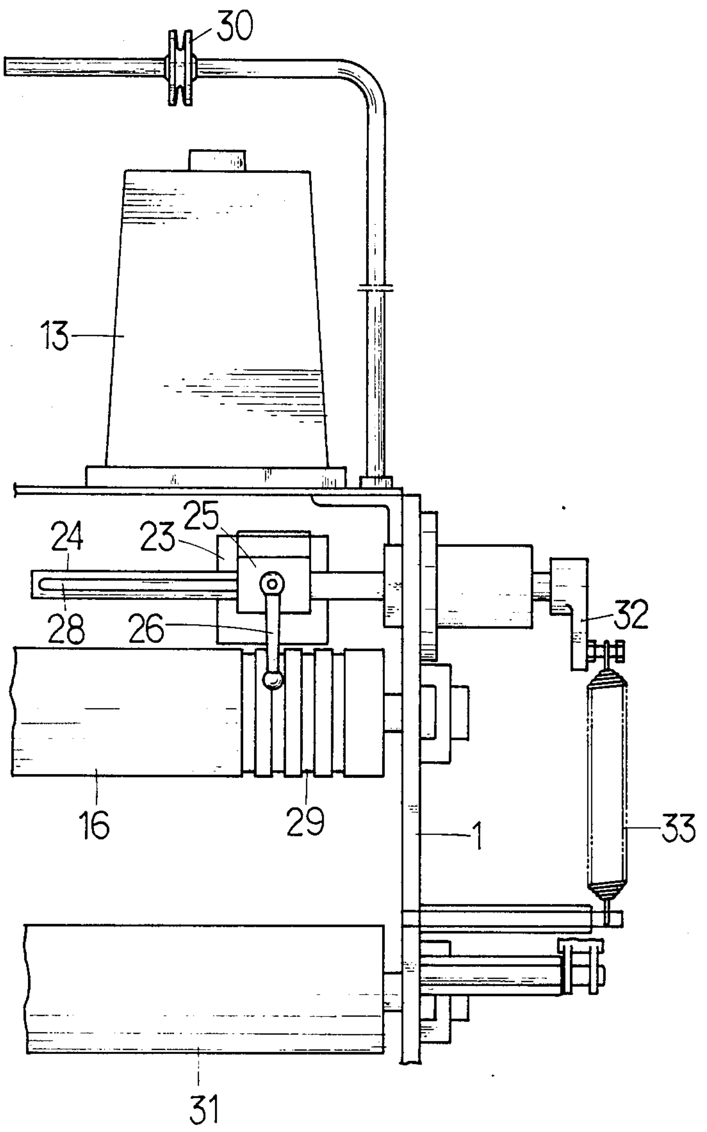
FIG. 6 is a fragmentary front view of a stretchable linear element laying section.
Figure 7:
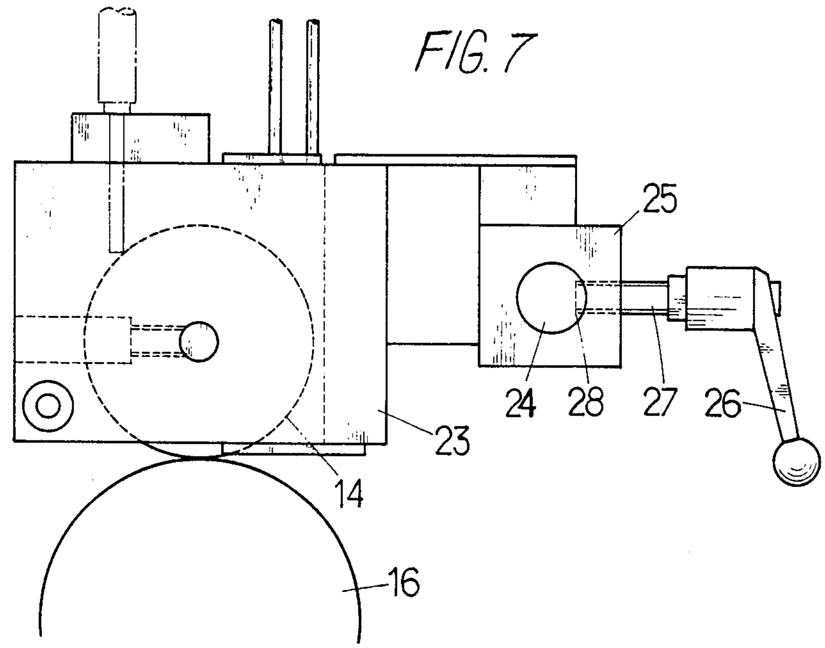
FIG. 7 is a side view of the principal portion of the stretchable linear element laying section.
Figure 8:
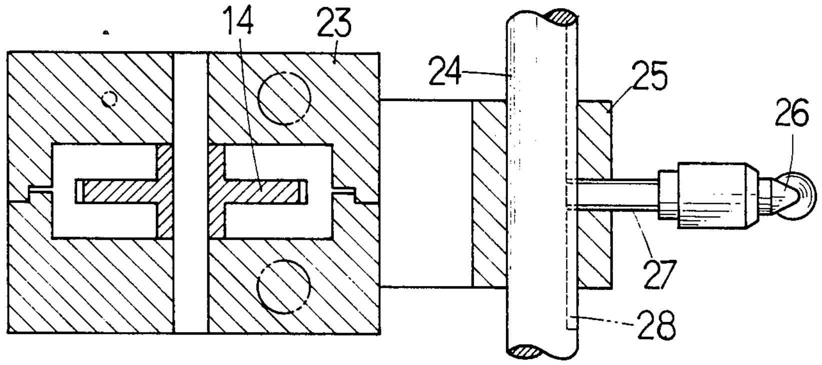
FIG. 8 is a horizontal sectional view of a stretchable linear element welding roll.

Each welding roll 14 has regularly spaced undulations on its outer peripheral surface and, as shown in FIGS. 6–8, is rotatably supported in a box 23 and adapted to be heated by suitably heating means to a desired temperature, said box 23 being fitted in a support 25 which is slidable inwardly and outwardly along a horizontal shaft 24 supported by a side frame on the machine frame 1. The support 25 is fitted on the horizontal shaft 24, and a screw 27 having a handle 26 is threadedly inserted in said support 25, the front end of said screw 27 being removably pressed against a groove 28 cut in the peripheral surface of the horizontal shaft 24.

The grooved roller 16 for pressing the opposite lateral end edges of the band-like material a against the welding rolls 14 has formed circumferential grooves 29 arranged at short intervals in the direction of the length of the roller 16.

A guide wheel 30 is disposed above each bobbin 13. The tension adjusting wheels 15 and guide wheels 17 and 18 disposed rearwardly of the bobbins 13 are positioned outwardly of the opposite lateral ends of the traveling band-like material a so that the stretchable linear elements b are passed from above the band-like material a and travel by the opposite sides of said material and then around the guide wheels 18 and, at the grooved roller 16, they are laid on the opposite lateral edges of the lower surface of the band-like material a.

A guide roller 31 is installed below said grooved roller 16, these rollers being rotatably supported between the side frames on the machine frame 1.

The horizontal shaft 24 has a lever 32 fixed to its end, and a spring 33 is tensioned between said lever 32 and a suitable region of the machine frame to press the welding roll 14 against the grooved roller 16.

The zigzag folding section 4 comprises upper and lower folding plates 34 and 35 disposed forwardly of said guide roller 31.

The upper folding plate 34 has a plurality of folding projections 38 of inverted L-shaped cross-section fixed to the lower surfaces of front and rear horizontal frames 36 and 37, the distance between adjacent depending legs of folding projections 38 being gradually decreased toward the front, so that the configuration of the folding plate is such that it tapers toward the front. Similarly, the lower folding plate 35 has a plurality of folding projections 41 of L-shaped cross-section fixed to the upper surfaces of front and rear frames 40, the distance between adjacent projections 41 being gradually decreased toward the front.

Figure 9:
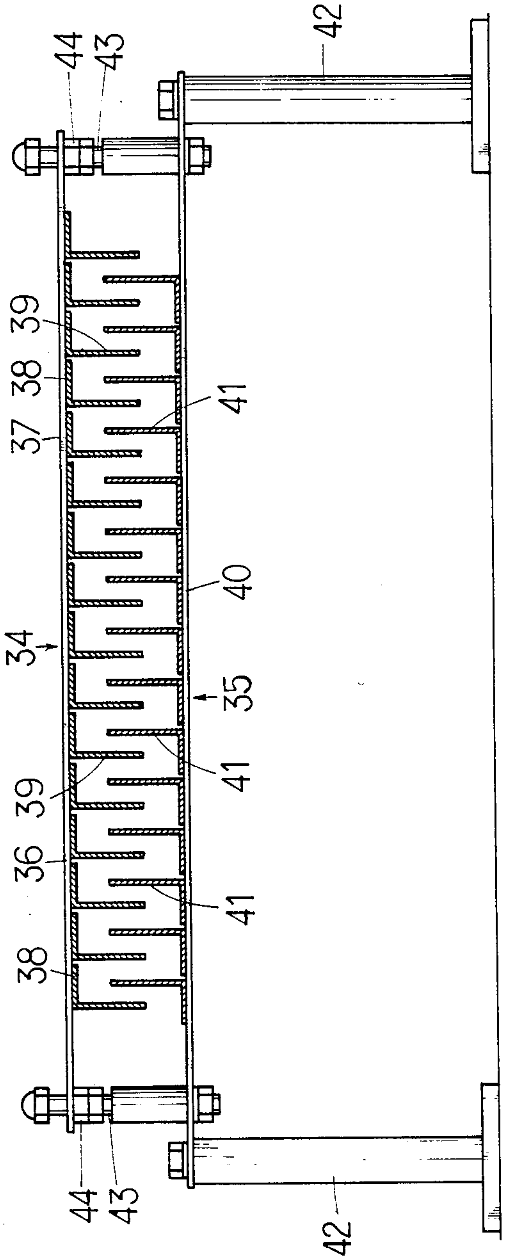
FIG. 9 is a vertical sectional front view of a band-like material zigzag folding section.

The upper and lower folding plates 34 and 35, as shown in FIG. 9, are vertically fitted together so that the folding projections 38 and 41 alternate with each other. The opposite ends of said horizontal frames 40 for the lower folding plate 35 are fixed on the upper ends of pillars 42 of the same height, while screw bars 43 are erected on the upper surfaces of the horizontal frames 40 at the opposite ends thereof. The opposite ends of the horizontal frames 36 and 37 for the upper folding plate 34 are mounted on nuts 44 threadedly fitted on said screw bars 43.

The upper folding plate 34 is gently downwardly inclined toward the front, as shown in FIG. 1, so that the distance between the opposed surfaces of the upper and lower folding plates 34 and 35 is largest at the band-like material inlet side and smallest at the outlet side, the amount of inclination being adjusted by moving said nuts 44. Further, the width with which the band-like material a will be folded can be adjusted by moving said nuts 44.

A span bar 45 and a relaxing member 46 (FIGS. 1 and 2) for imparting a suitable amount of widthwise slack to the band-like material a are positioned in the order mentioned between said guide roller 31 and the zigzag folding section 4. The span bar 45 is rearwardly downwardly inclined and curved in bow form, extending widthwise of the machine frame 1, serving to prevent widthwise contraction of the band-like material a by passing it in contact with and from below the span bar in an obliquely upward direction. The relaxing member 46 has its upper surface in the form of a saw-tooth-like undulating surface 47 corresponding to the folded condition of the band-like material a established by the folding projections 38 and 41 of the aforesaid upper and lower folding plates 34 and 35.

A pair of rear nip rollers 48 and 49 positioned adjacent the delivery side of the upper and lower folding plates 34 and 35 serve to press the opposite sides of the band-like material a folded by the zigzag folding section 4 and deliver it to a pair of front nip rollers 50 and 51 disposed forwardly of said rear nip rollers 48 and 49.

A guide frame 52 is disposed between the outlet side of the upper and lower folding plates 34, 35 and the rear nip rollers 48, 49 and has a transversely extending rectangular guide opening 53, which serves to hold the band-like material a in folded condition and guide it to the nip rollers 50, 51.

The fixed length seal mechanism section 5 is disposed between said rear and front nip rollers 48, 49 and 50, 51.

The fixed length seal mechanism section 5 comprises a carriage 55 slidable along fixed guide rods 54 extending longitudinally in parallel relation to each other, and a supersonic welding device 56 mounted on said carriage.

Figure 11:
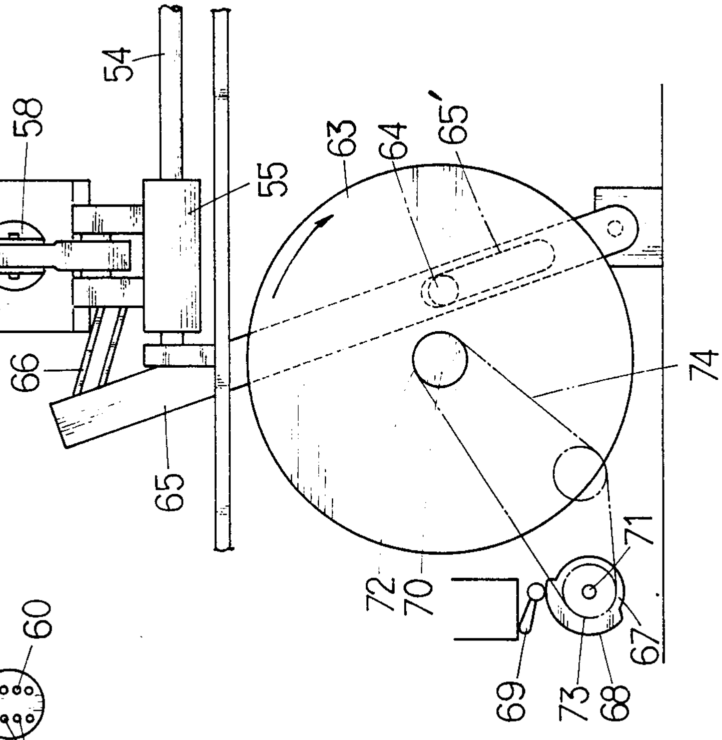
FIG. 11 is a side view of FIG. 10.
Figure 12:
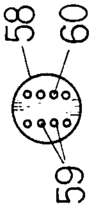
FIG. 12 is an end view of an anvil.
Figure 10:
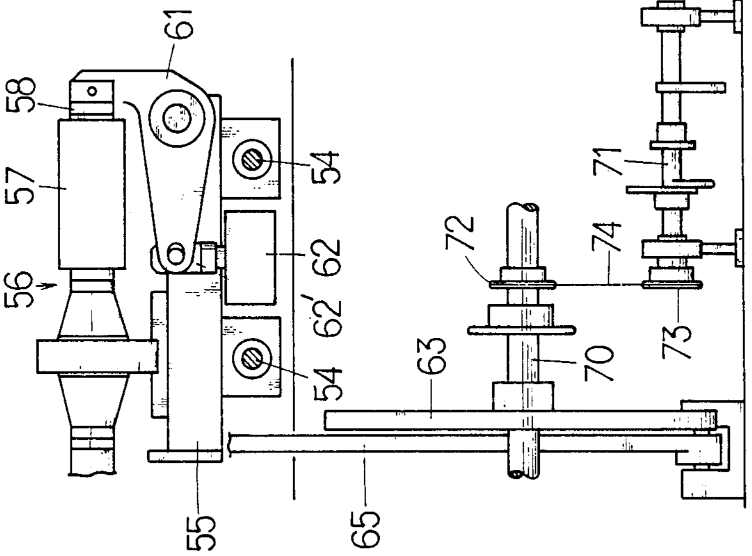
FIG. 10 is a front view of a fixed length sealing mechanism section.

The supersonic welding device 56, as shown in FIGS. 10 and 11, comprises a horn 57 and an anvil 58 which are opposed to each other to receive the folded material a therebetween, said anvil 58 having two suitably spaced vertical rows of projections 59 and 60, as shown in FIG. 12.

An L-shaped lever 61 pivotally supported at its middle by the carriage 55 is connected at its upper end to the back of the anvil 58 and at the other end to the piston rod 62' of an air cylinder 62 mounted on the carriage 55, so that the anvil 58 is moved toward and away from the horn 57 by the action of the air cylinder 62.

A rotary disk 63 rotatably supported by the machine frame below the fixed length seal mechanism section 5 is adapted to be rotated by a drive mechanism such as a motor (not shown) and has an eccentric pin 64 projecting from one surface thereof, said pin 64 being slidably inserted in an elongated opening 65' formed in a lever 65 pivotally supported at its lower end, so that when the rotary disk 63 is rotated, said lever 65 is moved back and forth to reciprocate the carriage through a link 66 connected between said lever 65 and the carriage 55.

A cam plate 67 is rotatably installed at a suitable place on the machine frame adjacent the rotary disk 63 and has a cam surface 68 contacting a microswitch 69 disposed thereabove to actuate said air cylinder 62.

The cam plate 67 is adapted to be rotated together with the rotary disk 63 by a chain 74 entrained between and around sprocket wheels 72 and 73 of the same diameter respectively fixed on the rotary shaft 70 of the rotary disk 63 and the center shaft 71 of the cam plate 67.

Figure 15:
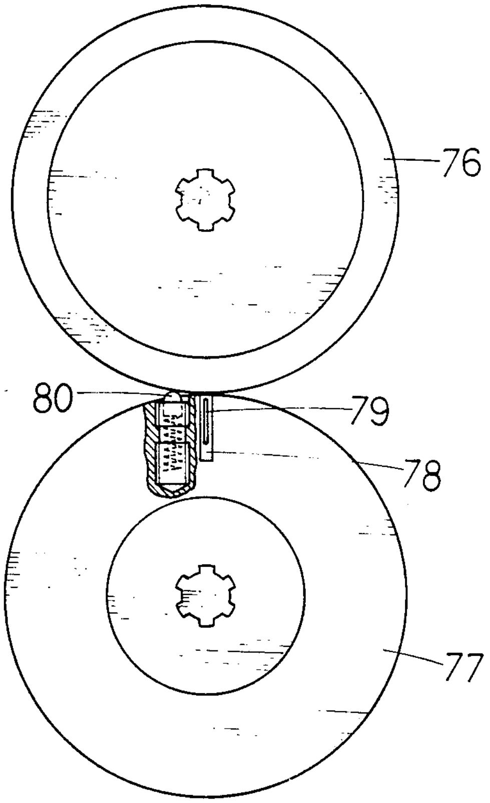
FIG. 15 is a plan view, partly broken away, showing the mounting relation between a press roll and a cutter roll.

The cutter section 6 (FIGS. 1 and 2) disposed forwardly of the front nip rollers 50 and 51 with a tension roller 75 positioned therebetween comprises a rotary press roller 76 and a rotary cutter roller 77 which are coated with rubber and pressed against each other. The outer peripheral surface of the cutter roller 77 pressed against the press roller 76 is formed with a longitudinal groove 78 radially extending from the surface, as shown in FIG. 13, with a cutter blade 79 received in said longitudinal groove 78 so that it comes in and out, while, as shown in FIG. 15, the cutter roll 77 is provided with a nipping projection 80 disposed rearwardly of said longitudinal groove 78 and adapted to be pressed against the rotary press roll 76 by the force of a spring during cutting.

Figure 13:
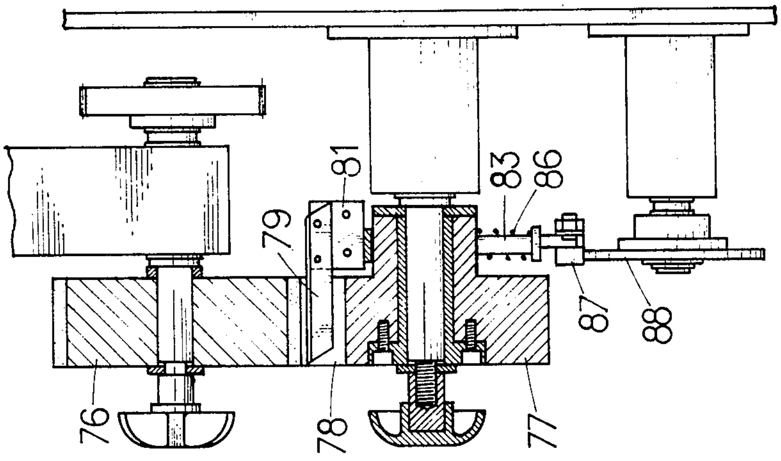
FIG. 13 is a vertical sectional front view of the principal portion of a cutter section.
Figure 14:
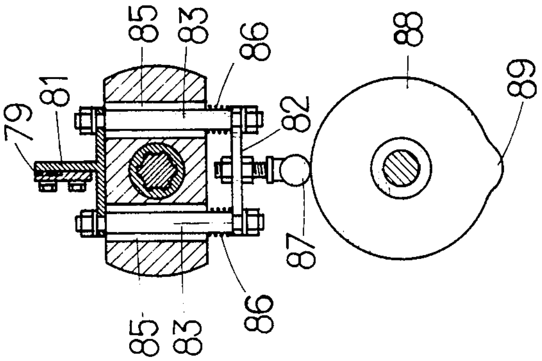
FIG. 14 is a horizontal sectional view of the principal portion of a cutter blade actuating mechanism.

The cutter blade 79, as shown in FIGS. 13 and 14, has an end projecting out of one side of the longitudinal groove 78 and fixed to a movable plate 81, with guide rods 83 fixedly connected between opposite ends of said movable plate 81 and opposite ends of an actuator plate 82 positioned rearwardly of said movable plate in opposed relation thereto, said guide rods 83 being inserted in vertical holes 85 formed in the lower portion of the cutter roller 77, with springs 86 interposed between the lateral surface of said lower portion and the lateral surface of the actuator plate 82.

A roller 87 supported at the middle lower surface area of the actuator plate 82 is adapted to be synchronously pressed against a circular cam plate 88 which is rotated in synchronism with the aforesaid cam plate 67, said circular cam plate 88 having a roller pushing projection 89 formed on a portion of its outer peripheral surface.

A chute 90 (FIGS. 1 and 2) installed at the other end of the machine frame 1 serves to discharge products coming from the rotary press roller 76 and rotary cutter roller 77.

The operation of the bouffant cap producing apparatus shown in the above embodiment will now be described.

First, the center shaft 8 is inserted in the paper bobbin having the band-like material a wound thereon and is supported at its opposite ends in the bearings 9 disposed on opposite sides at one end of the machine frame 1, while the distance between the guide rolls 12 on the guide shaft 11 installed between the inclined plates 7 is adjusted so that the opposite sides of the band-like material a may be guided in slide contact with the opposed end surfaces of the collar portions 12*a*.

The band-like material a thus prepared in the support and supply section 2 is automatically delivered at a constant speed from one end of the machine frame 1 toward the other end. As the winding diameter decreases during delivery, the guide shaft 11 mounted on the inclined plates 7 moves to the winding surface of the band-like material a, thus maintaining its guide rollers 12 always in contact with the winding suface.

Thus, the band-like material a is withdrawn in slide contact with the peripheral surfaces of said rollers 12 while being prevented by the collar portions 12*a* from traveling in zigzags. It is fed via the grooved roll 16, guide roller 31, span bar 45 and relaxing member 46 into the zigzag folding section 4, and it is passed through said folding section 4 while being folded, whereupon it continuously travels at a constant speed via the nip rollers 48 and 49, and fixed length seal mechanism section 5 toward the cutter section 6.

The stretchable linear elements b such as rubber strings are payed out from the bobbins 13, traveling around the guide wheels 30, tension adjusting wheels 15, and guide wheels 17 and then by the sides of the band-like material a and to the guide wheels 18, grooved roller 16 and guide roller 31.

In this case, depending upon the magnitude of the width of the band-like material a, the stretchable linear elements b are fitted in suitable ones of the circumferential grooves 29 of the grooved roller 16 contacting the lower surface of the band-like material a. Similarly, the positions of the welding rolls 14 pressed against the opposite sides of the grooved roll 16 are adjusted by moving said welding rolls along the horizontal shaft 24 in the direction of the width of the band-like material a, and said welding rollers are fixed at the proper position where they press the stretchable linear elements b entrained around the grooved roller 16.

When the opposite sides of the band-like material a reach the welding rolls 14 and are nipped between said rolls 14 and grooved roller 16, the stretchable linear elements b are welded to the opposite sides of the lower surface of the band-like material a by the welding rolls 14 longitudinally at short intervals while said elements are in stretched condition, whereupon the band-like material a is led to the lower guide roller 31 and then from the lower surface of the span bar 45 it is led to the upper surface of the relaxing member 46.

If the band-like material a spread by the span bar 45 were passed between the upper and lower folding plates 34 and 35 of the zigzag folding section 4 without providing the relaxing member 46, an excessive tension would be widthwise produced in the band-like material a as it approaches the folding end of the folding plates 34 and 35, causing danger of damaging the middle portion of the band-like material a. To avoid this, the band-like material a is placed on the undulating surface 47 of the relaxing member 46 and thereby giving a slack in the direction of the width, and then it is fed to the upper and lower folding plates 34 and 35.

When the band-like material a is fed into between the upper and lower folding plates 34 and 35, since the degree of fit between the upper and lower folding projections 38 and 41 as seen from the side is gradually increased as the band-like material a travels and since the distance between the upper and lower folding projections 38 and 41 is decreased, the band-like material a is gradually folded in zigzags. Thus, when it has passed through the upper and lower folding plates 34 and 35, it becomes a bunched folded material a' having a number of folds d of fixed width.

The material a' thus folded is withdrawn through the guide hole 53 of the guide frame 52 by the rear nip rollers 48 and 49 and fed to the fixed length seal mechanism section 5.

The carriage 55 installed in the fixed length seal mechanism 5 is moved at the same speed and in the same direction as the band-like material a' by the rotation of the rotary disk 63 through the lever 65 and link 66. The microswitch 69 is actuated by the cam plate 67 rotated in operative association with the rotary disk 63, so that during the forward movement of the carriage 55, the piston rod 62' of the air cylinder 62 is retracted and during the backward movement it is advanced, thereby moving the anvil 58 toward and away from the horn 57. Thus, when the carriage 55 advances after retraction, the anvil 58 and horn 57 of the supersonic welding device 56 nip the folded material a' therebetween and advance with it a fixed distance, during which advance a portion of the folded material nipped therebetween is welded.

Figure 16:
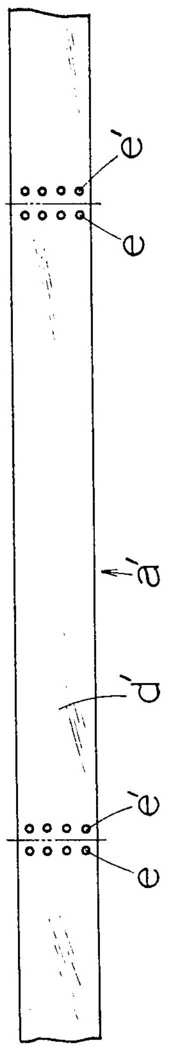
FIG. 16 is a side view showing a portion of a material folded as a semi-finished product before being cut.

That is, supersonic vibration waves produced from the horn 57 heat and melt the portion between the outermost folds d' of the folded material a' pressed against the projections 59 and 60 on the anvil 58, so that only those portions of the stretchable linear elements b laid on said outermost folds d' which are pressed against said projections 59 and 60 are pierced and all the folds d between the outermost folds d' are welded together in two rows of spots e and e' corresponding to the pattern of the projections 59 and 60 (FIG. 16).

When the carriage 55 advances a fixed distance, the anvil 58 separates from the horn 57 to remove the welding action on the folded material a'. In this condition, it is retracted again to nip the folded material a' between the anvil 58 and the horn 57 to effect welding, as described above.

With this operation repeated, the portion between the outermost folds d' of the traveling folded material a' is successively welded in the direction of the length at fixed intervals. The length between adjacent welds is half the circumference of the resulting bouffant cap.

The folded material a' thus welded at fixed intervals is continuously fed to the cutter section 6 through the nip rollers 50 and 51 and is discharged to the chute by the rotation of the press roller 76 while the rotary press rollers 76 and the nipping projection 80 pressed against said roller 76 prevent release of the material a'. In this case, when the rows of spot welds e and e' reach the nip between the press roller 76 and cutter roller 77, the rotation of the press roller 76 is stopped for an instant and at the same time the projection 89 on the circular cam plate 88 presses the roller 87 to move the cutter blade 79 toward the press roller 76, thereby instantaneously cutting the middle between the two rows of welds e and e'.

Figure 17:
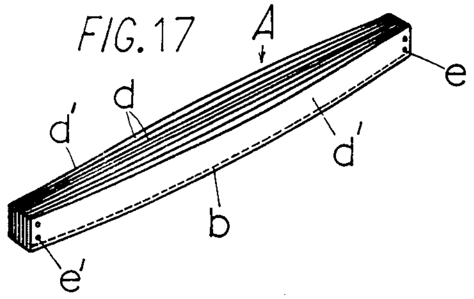
FIG. 17 is a perspective view of a product in folded condition.

After cutting, the rotation of the cutter roller 77 brings the roller 87 away from the cam plate 88, whereupon the cutter blade 79 is retracted, while the folded material a' is fed by the rotation of the cutter roller 77 and press roller 79 until the next welds e and e' reach the cutter section. With this operation repeated, a number of folded products A of fixed length with the opposite ends welded, as shown in FIG. 17, are produced.

Figure 18:
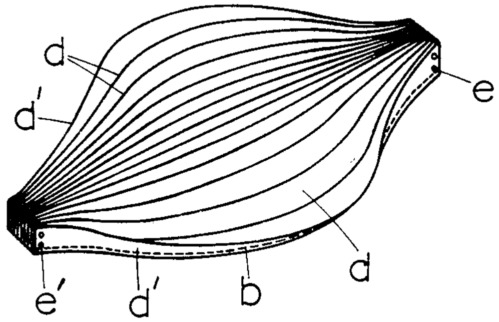
FIG. 18 is a perspective view of a folded product in unfolded condition.
Figure 19:
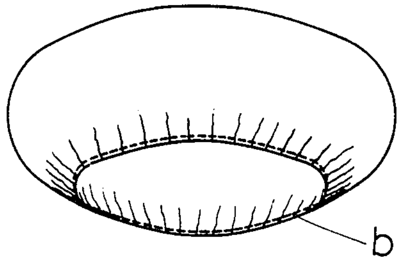
FIG. 19 is a perspective view of a bouffant cap in completely unfolded state.

Spreading this folded product A in the direction which separates the folds between the outermost folds d', as shown in FIG. 18, and then upwardly pushing the intermediate folds thus spread provides a simple bouffant cap having the stretchable linear elements b attached to the lower peripheral end edges, as shown in FIG. 19.

While a preferred embodiment of the invention has been described, it is for illustrative purposes only, and it is to be understood that all changes and modifications thereof that do not depart from the spirit and scope of the invention are to be included in the appended claims.

What is claimed is:

1. Apparatus for producing bouffant caps and the like, comprising:

a longitudinally extending frame for mounting the apparatus components along a straight line of travel, said frame having a forward end and a rearward end;

a support and supply section mounted at said frame rearward end comprising means for deliverably supporting a band-like material wound in roll form; and means for automatically delivering the material at a constant speed and in a generally horizontal orientation, the material thus having an upper and a lower side;

a stretchable linear element laying section mounted on said frame forward of said support and supply section and comprising two bobbin means each for containing a supply of a stretchable linear element and means for continuously laying the linear elements on and along opposite lateral edges of the material being delivered, and tension adjusting means disposed below said bobbin means for adjusting the tension of the linear element;

a welding section mounted on said frame forward of said element laying section comprising means for integrally welding the laid linear elements to the material;

a zigzag folding section mounted on said frame forward of said welding section, said zigzag folding section comprising means for supplying the material with welded linear elements, and means for continuously zigzag folding said supplied material in the transverse direction;

a fixed length seal section mounted on said frame forward of said zigzag folding section comprising means for bunching the zigzag folded material, and means for welding the bunched material between the stretchable linear elements on both sides at fixed length intervals; and a cutter section mounted on said frame forward of said seal section for successively cutting said material substantially transversely to the longitubinal direction at the middle of each welded region.

2. An apparatus for producing bouffant caps and the like as set forth in claim 1, wherein said delivering means of said band-like material support and supply section comprises two inclined plates fixedly erected on the upper surface of said frame on opposite sides at said rearward end thereof, the upper end surfaces of said inclined plates downwardly sloping from the forward end thereof to the rearward end thereof, bearings fixed on the machine frame adjacent the lower ends of said inclined plates for removably supporting a center shaft of the material roll, a grooved guide shaft adapted to fit at its opposite ends on the sloped surfaces of said inclined plates and roll along said sloped surfaces, and guide rollers slidably removably fitted on the opposite sides of said guide shaft and each guide roller having a roller portion and a collar portion of larger diameter such that the material is constrained therebetween in contact with said roller portion.

3. An apparatus for producing bouffant caps and the like as set forth in claim 1, wherein the stretchable linear element laying section comprises two bobbins installed on opposite sides of the machine frame above the upper surface of the material, and each having a stretchable linear element wound thereon, welding rollers and tension adjusting rollers disposed forwardly and rearwardly of and below said bobbins, guide wheels disposed rearwardly of said tension adjusting wheels, and guide wheels disposed below the first-mentioned guide wheels for feeding the stretchable linear elements to said welding rollers.

4. An apparatus for producing bouffant caps and the like as set forth in claim 1, wherein the zigzag folding section comprises relaxing means for reducing transverse tension in the material, and a pair of longitudinally extending upper and lower folding plates located forward of said relaxing means, each plate having a plurality of folding projections, said folding projections being fitted together so as to alternate with each other.

5. An apparatus for producing bouffant caps and the like as set forth in claim 1, wherein the fixed length seal section comprises two guide bars installed on the machine frame and extending in the direction of travel of the band-like material, a carriage slidable on said guide bars, and a supersonic welding device mounted on said carriage.

6. An apparatus for producing bouffant caps and the like as set forth in claim 1, wherein the cutter section comprises a rotary press roller and a rotary cutter roller which are pressed against each other, the outer peripheral surface of said cutter roller being provided with a longitudinal groove extending radially from the surface, a cutter blade received in said longitudinal groove so that it comes in and out, and a nipping projection disposed rearwardly of said longitudinal groove and adapted to be pressed against said rotary press roller by the pressure of a spring during cutting.

7. An apparatus for producing bouffant caps and the like as set forth in claim 1, wherein said delivering means of said band-like material support and supply section comprises two inclined plates fixedly erected on the upper surface of said frame on opposite sides at said rearward end thereof, the upper end surfaces of said inclined plates downwardly sloping from the forward end thereof to the rearward end thereof, bearings fixed on the machine frame adjacent the lower ends of said inclined plates for removably supporting a center shaft of the material roll, a grooved guide shaft adapted to fit at its opposite ends on the sloped surfaces of said inclined plates and roll along said sloped surfaces, and guide rollers slidably removably fitted on the opposite sides of said guide shaft and each guide roller having a roller portion and a collar portion of larger diameter such that the material is constrained therebetween in contact with said roller portion; and an apparatus wherein the stretchable linear element laying section comprises two bobbins installed on opposite sides of the machine frame above the upper surface of the material, and each having a stretchable linear element wound thereon, welding rollers and tension adjusting rollers disposed forwardly and rearwardly of and below said bobbins, guide wheels disposed rearwardly of said tension adjusting wheels, and guide wheels disposed below the first-mentioned guide wheels for feeding the stretchable linear elements to said welding rollers.

8. An apparatus for producing bouffant caps and the like as set forth in claim 7, wherein the zigzag folding section comprises relaxing means for reducing transverse tension in the material, and a pair of longitudinally extending upper and lower folding plates located forward of said relaxing means, each plate having a plurality of folding projections, said folding projections being fitted together so as to alternate with each other.

9. An apparatus for producing bouffant caps and the like as set forth in claim 8, wherein the fixed length seal section comprises two guide bars installed on the machine frame and extending in the direction of travel of the band-like material, a carriage slidable on said guide bars, and a supersonic welding device mounted on said carriage.

10. An apparatus for producing bouffant caps and the like as set forth in claim 9, wherein the cutter section comprises a rotary press roller and a rotary cutter roller which are pressed against each other, the outer peripheral surface of said cutter roller being provided with a longitudinal groove extending radially from the surface, a cutter blade received in said longitudinal groove so that it comes in and out, and a nipping projection disposed rearwardly of said longitudinal groove and adapted to be pressed against said rotary press roller by the pressure of a spring during cutting.

11. An apparatus for producing bouffant caps and the like as set forth in claim 4, wherein the degree of fit between said upper and lower folding plates gradually increases from the rearward to the forward ends of said plates and the distance between said upper and lower folding plates gradually decreases from the rearward to the forward ends of said plates.

12. An apparatus for producing bouffant caps and the like as set forth in claim 8, wherein the degree of fit between said upper and lower folding plates gradually increases from the rearward to the forward ends of said plates and the distance between said upper and lower folding plates gradually decreases from the rearward to the forward ends of said plates.

13. An apparatus for producing bouffant caps, comprising a band-like material support and supply section for deliverably supporting a band-like material such as a non-woven fabric or film wound in roll form; said band-like material support and supply section comprises two inclined plates fixedly erected on the upper surface of the machine frame on opposite sides at one end thereof, the upper end surfaces of said inclined plates downwardly sloping from the front end to the rear end of the machine frame, bearings fixed on the machine frame adjacent the lower ends of said inclined plates for removably supporting a center shaft, a grooved guide shaft adapted to fit at its opposite ends on the sloped surfaces, and guide rolls slidably removably fitted on the opposite sides of said guide shaft and having collar portions of larger diameter;

a stretchable linear element laying section for continuously laying stretchable linear elements on and along opposite lateral edges of said band-like material being delivered while withdrawing said stretchable linear elements from bobbins;

a welding section for integrally welding the stretchable linear elements laid on opposite lateral edges of the band-like material to the latter;

a zigzag folding section through which the band-like material with said stretchable linear elements welded thereto is passed whereby it is zigzag folded in the direction of the width;

a fixed length seal section for welding the zigzag bunched folded material between the stretchable linear elements on both sides at fixed intervals of length; and a cutter section for successively cutting said material substantially transversely to the longitubinal direction at the middle of each welded region.

* * * * *